Patented Nov. 1, 1949

2,486,399

UNITED STATES PATENT OFFICE 2,486,399

POLYMERIC POLYHYDRIC ALCOHOL CONDENSATION PRODUCTS AND TREATMENT OF CELLULOSIC TEXTILES THEREWITH

Dmitry M. Gagarine, Danville, Va., assignor to Dan River Mills, Incorporated, a corporation of Virginia No Drawing. Application October 28, 1947, Serial No. 782,675

15 Claims. (Cl. 8—115.6)

This invention relates to condensation products of polymeric polyhydric alcohols and ketones, with aldehydes, and treating textiles therewith. A typical but non-limiting example of such products is a co-polymer of starch methylol and acetone methylol, which may be used for treatment of cellulosic fabrics to give special effects such as, for example, shrinkage setting, mildew resistance, improved crease resistance, etc., as described hereafter.

In accordance with this invention, I have discovered that starch methylol, which is obtained by reacting starch with formaldehyde in the presence of alkaline catalysts, will react or condense with acetone methylol, which is obtained by reacting acetone with formaldehyde in the presence of alkaline catalysts, to produce a colorless, starch-formaldehyde-acetone co-polymer or condensation product. Also, I have found that when this co-polymer is catalyzed with mild alkaline catalysts and applied to fabrics and heated thereon it will react with the cellulose of the fabric to produce cellulose ethers and thereby impart to the fabric new desirable properties.

The relative proportions of the starch methylol and acetone methylol components of the co-polymer may be varied substantially with corresponding variations in the properties of the co-polymer for treating textiles. Increasing the proportion of starch methylol decreases the tendering effect of the condensation product when used on textiles and increases the crispness and body of the treated fabric. The maximum shrinkage setting property of the product is obtained by a ratio of one part of starch methylol to three parts of acetone methylol. In the usual case it is not desirable to increase the proportion above 1 part of starch methylol to 1½ parts of acetone methylol because such higher proportions tend to leave unreacted starch methylol, which would dilute the condensation products.

Likewise, in the usual case, it is not desirable to decrease the proportion of starch methylol below 1 part thereof to about 10 parts of acetone methylol. Although, some benefit is obtained from the use of any small amount of the starch methylol, in combination with the acetone methylol, if too small amounts of starch methylol are used the true benefits characteristic of this invention are not obtained. So, generally speaking, the over-all range of proportions for most textile applications is about 1 part of starch methylol to about 1½ to 10 parts of acetone methylol; optimum shrinkage setting results being obtained with a proportion of about 1 part of starch methylol to 3 parts of acetone methylol, as above mentioned.

In some commercial practices of the invention I have found it advantageous to prepare the condensation product with a proportion of approximately 1 part of starch methylol to 6 parts of acetone methylol and use this product as such or add to it an additional amount of starch at the time of application of the product to the textile, depending upon the nature of the textile.

For example, if a delicate voile type of cloth is being treated, the starch or starch methylol proportion need not be increased beyond the 1 to 6 ratio. However, with heavier fabrics, starch may be added to the 1 to 6 ratio product to increase the ratio, up to as high as the 1 to 1½ ratio mentioned above.

Illustrative but non-limiting examples of the polymeric polyhydric alcohols that may be used are, potato and corn starch, cellulose, dextrines, polyvinyl alcohol, and hydroxy ethyl cellulose. The potato starch tends to give softer textile finishing properties while the corn starch tends to give a stiffer effect on the treated textile material. The hydroxy ethyl cellulose gives a flat drying finish without ironing.

The ratio of the amount of formaldehyde to the amount of acetone with which it is reacted may be varied over a considerable range, such as 2 to 6 mols of formaldehyde to 1 mol of acetone. The resulting products, when condensed with the starch methylol, provide somewhat different characteristics in the final condensation product, with regard to the effects produced by this product on textiles. For example a mol ratio of about 5 or 6 mols of formaldehyde to 1 mol of acetone will give best shrinkage resistance to the textile fabric with least tendering; while a mol ratio of about 2 to 4 mols of formaldehyde to 1 mol of acetone will give best crease resistance and mildew resistance in the fabric.

An important feature of this invention is the control of the condensation reaction that takes place when the starch, acetone, and formaldehyde are reacted in the presence of an alkaline catalyst. A limited amount of strong catalyst, such as sodium hydroxide, may be used to produce the condensation reaction. However, I have discovered that the optimum condition of manufacture and the most desirable properties in the condensation product are obtained if a combination of a strong and weak catalyst is used. The strong catalyst starts the condensation reaction, and due to the exothermic nature of the reaction, the temperature rises. The amount of the strong catalyst is limited so that it soon exhausts. The milder catalyst then carries the reaction along at the elevated temperature but at a slower rate, and a more desirable product is formed.

In accordance with the present invention, I regulate the proportions of the strong and mild alkaline catalysts so as to prevent any initial violent reaction between the several constituents of the composition at room temperature; and I then confine the entire reaction mixture in a strong, tightly closed container in which the exothermic condensation reaction can proceed without danger until the catalysts are exhausted.

Another important feature of my invention is the use of the catalyst mixture in limited amounts so that the condensation reaction does not go to completion and the condensed product is in a highly reactive state for its subsequent use on cellulosic materials. This process results in the above mentioned condensed product, which is completely soluble in water. This product upon application to textiles and slight additional catalyzing with an alkaline catalyst will react with the cellulose upon heating.

For producing the starch methylol component of the co-polymer, the starch is caused to react with the formaldehyde by means of the above described combination of alkaline catalysts. The reaction product is water soluble, when an excess of formaldehyde is used.

To produce the acetone-formaldehyde component, the two constituents are mixed together but do not react until the alkaline catalysts are added. The catalysts are first incorporated in the starch-formaldehyde mixture as mentioned above and do not act on the acetone formaldehyde until these components are brought together.

Now, to obtain the co-polymer, the starch-formaldehyde and acetone-formaldehyde components are mixed together and they inter react, under the influence of the alkaline catalyst, to produce the starch-formaldehyde-acetone condensation product.

The alkaline catalysts that may be used in the condensation reaction comprise strong alkalis such as sodium hydroxide and potassium hydroxide, and milder alkalis such as sodium carbonate, potassium carbonate, trisodium phosphate, potassium phosphate, and sodium sulfide. I have found it advantageous in commercial practice of the invention, to use sodium hydroxide and sodium carbonate. A satisfactory range for the percentage of sodium hydroxide used is about 0.1% to 1.5%; and for the sodium carbonate, about 0.2% to 3% based on the total weight of the condensation reactants. A typical commercial example is 0.25% of sodium hydroxide and 0.7% sodium carbonate.

A typical example of the preparation of the product of this invention is as follows:

Two tanks, each equipped with stirrers, and connected together through a pump, are used for mixing the starch-formaldehyde and the acetone-formaldehyde, first separately and then mixing these components. In one tank, which is referred to below as Tank A, the following amounts and procedures are used.

*Tank A*

|   | Pounds |
|---|---|
| Formaldehyde (37%) | 475 |
| Corn starch | 55 |

The starch is placed in the tank and the formaldehyde run in and the mixture stirred for about 2 to 3 minutes to give a good uniform admixture. No reaction takes place yet. Then to this mixture is added:

|   | Pounds |
|---|---|
| Sodium hydroxide | 2.5 |
| Sodium carbonate | 6.5 |
| Water | 37 |

This mixture of alkalis causes the formaldehyde to act on the starch. The mixture first becomes viscous and then thins down to a clear fluid. It requires about 5 minutes for the starch methylol to form.

In the other tank, referred to below as Tank B, the following amounts and procedures are used:

*Tank B*

|   | Pounds |
|---|---|
| Formaldehyde | 475 |
| Acetone | 171 |

These are mixed well and the mixture pumped from this Tank B into Tank A, while stirring the mixture in Tank A. The resulting mixture is then stirred for about 5 minutes. When the acetone formaldehyde mixture is mixed with the alkalis in Tank A, the alkalis catalyze the condensation reaction between the acetone and formaldehyde and also between their reaction product and the previously formed starch methylol. These condensation reactions begin to take place promptly and as soon as a good mixture of all of the constituents is obtained in Tank A, it is important to confine the product in a closed container or containers, within an hour and a half of the final mixing.

In the commercial practice of my invention I have found it advantageous to run the final mixture of Tank A into conventional, 55 gallon, steel drums which will withstand the pressure developed during the subsequent condensation reaction, which is about 16 to 20 pounds per square inch. This emptying of the reaction tank and filling of the drums which are then tightly stopped, requires usually about 30 minutes total time; and I regulate the amount of strong alkali, sodium hydroxide, catalyst so that the condensation reaction will not begin or at least will not proceed very far within this time limit. The pH of the mixture at the time of filling the drums is usually about pH 12.

All of the foregoing operations involved in the preparation of the mixture which is run into the steel drums, may be carried out at room temperature.

In the steel drums, the condensation proceeds rather slowly for about an hour and a half and then suddenly becomes vigorous. The reaction is exothermic and the temperature of the product in the drum rises to about 97° C., and a pressure is established, in the drums, of about 16 pounds per square inch. This vigorous reaction then subsides and the activity diminishes as the pH diminishes over a period of about 40 hours, when the pH finally reaches a value of about 7, and the limited amount of catalysts employed has been exhausted. The strong alkali, e. g. caustic soda, produces the vigorous reaction, and the mild alkali, e. g. soda ash, effects the prolonged, slower and milder reaction, until the catalyst is exhausted.

In addition to safety reasons, it is important to confine the reaction mixture, during the above described condensation reaction, so as to preserve the acetone vapors and thereby maintain the proper acetone-formaldehyde mol ratio, above described. Also, confining these vapors creates the pressure which accelerates the condensation reaction.

When the condensation reaction has stopped, the product has reached its maximum viscosity and the limited amount of catalysts is exhausted. The product is clear and colorless and has only a faint odor of acetone and formaldehyde. Other characteristics of this product are as follows:

Specific gravity _____ 1.18 at 25° C.
Flash point _____ None
Water solubility _____ Completely soluble at 25° C.

This product may be diluted with water to any desired concentration and used for treating textiles or other materials to obtain special effects not normally possessed by these materials, as described in the following examples:

Example I 40 pounds of soda ash were dissolved in 100 gallons of water. To this aqueous soda ash solution was added 400 pounds of the above starch-formaldehyde-acetone product and the resulting mixture was diluted with water to a total volume of 250 gallons. This solution was then run into a conventional "pad," consisting of a pad box and two squeeze rolls. The cloth to be treated, which in this case was a cotton gingham averaging about 5 yards to the pound, was run through the solution in the pad box and then through the squeeze rolls. Next, this cloth, impregnated with the condensation product, was run onto a 90 foot tenter frame heated to 305° F. The speed of the cloth was 90 to 100 yards per minute. The cloth was heated and substantially dried on the tenter which caused the condensation product to react with the cellulose of the cloth to form insoluble cellulose ethers.

Following the tenter, the cloth was washed, which removed the excess or unreacted portion of the condensation product. After washing, the cloth was dried and was then ready for use.

Example II

To obtain the above mentioned flat-drying characteristic, the corn starch, described above, is substituted by 110 pounds of water soluble hydroxy ethyl cellulose. Or, the corn starch formula given above may be used and the cloth pretreated with alkali soluble hydroxy ethyl cellulose. Or the water soluble hydroxy ethyl cellulose, 3% on the weight of the cloth, may be incorporated in the regular starch formula above.

Example III

For treating viscose rayon, the cloth is padded with the following:

|  | Per cent |
|---|---|
| The condensation product | 20 |
| Soda ash | 0.5 | then dried in the tenter frame as in Example I above, and then cured for five minutes at 140° C. As compared with the treatment of cotton, in Example I above, the rayon requires a decrease in the soda ash catalyst from 2% to 0.5% and an increase in the curing time from about 20 seconds for cotton, to 5 minutes for the rayon.

Cloth treated in the above manner, and especially as a result of the reaction between the condensation product and the cellulose, possesses a number of unique and commercially important characteristics such as the following:

(a) Shrinkage setting
(b) Permanent finish or body
(c) Improved crease resistance
(d) Mildew resistance
(e) Odorless
(f) Non-chlorine retentive
(g) Good tensile strength
(h) Longer wear Regarding the shrinkage setting characteristics, cotton cloth which normally had a washed width of 34", when treated in accordance with Example I above, had a washed width of 35½", and 3½% gain in length, which substantially increases the value of the cloth. Also, this treated cloth will resist shrinking considerably more than mechanically shrunk fabrics, with repeated washing.

The permanent finish or body remains after laundering, as contrasted with starch sizing which is removed upon laundering.

With regard to the crease resistance and tensile strength characteristics, I have found that they improve with ageing. For example, after 6 to 12 months ageing the crease resistance is improved 100% or more and the tensile strength has increased about 10% or more and both of these effects are permanent to washing.

The non-chlorine retentive characteristic is of value in connection with laundry bleaching in which the goods are treated with chlorine type bleaches. If chlorine were retained, as is the case with urea formaldehyde and melamine, it would produce hydrochloric acid during the ironing which would deteriorate the goods.

The features of combining a strong and a mild alkali catalyst, and of carrying out the condensation reaction in a plurality of closed containers to avoid explosion hazards and provide accurate control of the condensation reaction, as disclosed herein, may be utilized advantageously in the production of the acetone-formaldehyde condensation product alone, to which starch may later be added if desired. These modifications are not claimed in this application, but are disclosed in detail and claimed in my copending application Serial No. 92,958, filed May 12, 1949.

Various modifications and changes may be made in the above described products and procedures without departing from the scope of my invention as defined in the appended claims.

I claim:

1. A method of producing a water soluble, reactive condensation product, suitable for treating textiles, which comprises reacting a high polymeric polyhydric alcohol with formaldehyde in the presence of an alkaline catalyst to produce a high polymeric polyhydric alcohol methylol, adding to said methylol and catalyst a mixture of acetone and formaldehyde to produce a reaction therebetween with the formation of an acetone methylol and to produce a reaction between said two methylols, confining the resulting reaction solution in tightly closed pressure resistant containers in which the condensation reaction proceeds until the amount of catalyst is exhausted and the resulting condensation product is substantially neutral, is soluble in water and may be activated for treatment of textiles by the addition of a mild alkaline catalyst.

2. A method of producing a water soluble, reactive condensation product, suitable for treating textiles, which comprises reacting starch and formaldehyde in the presence of an alkaline catalyst to produce a starch methylol, adding to said methylol and catalyst a mixture of acetone and formaldehyde to produce a reaction therebetween with the formation of an acetone methylol and to produce a reaction between said two methylols, confining the resulting reaction solution in tightly closed pressure resistant containers in which the condensation reaction proceeds until the amount of catalyst is exhausted and the resulting condensation product is substantially neutral, is soluble in water and may be activated for treatment of textiles by the addition of a mild alkaline catalyst.

3. A method of producing a water soluble, reactive condensation product, suitable for treating textiles, which comprises reacting starch and formaldehyde in the presence of an alkaline catalyst to produce a starch methylol, adding to said methylol and catalyst a mixture of acetone and formaldehyde to produce a reaction therebetween with the formation of an acetone methylol and to produce a reaction between said two methylols, the relative proportions of the two methylols being one to two parts of the starch methylol to three parts of the acetone methylol, confining the resulting reaction solution in tightly closed pressure resistant containers in which the condensation reaction proceeds until the amount of catalyst is exhausted and the resulting condensation product is substantially neutral, is soluble in water and may be activated for treatment of textiles by the addition of a mild alkaline catalyst.

4. A method of producing a water soluble, reactive condensation product, suitable for treating textiles, which comprises reacting starch and formaldehyde in the presence of an alkaline catalyst to produce a starch methylol, adding to said methylol and catalyst a mixture of acetone and formaldehyde to produce a reaction therebetween with the formation of an acetone methylol and to produce a reaction between said two methylols, the relative proportions of the two methylols being 1 part of starch methylol to about 1½ to 10 parts of acetone methylol, confining the resulting reaction solution in tightly closed pressure resistant containers in which the condensation reaction proceeds until the amount of catalyst is exhausted and the resulting condensation product is substantially neutral, is soluble in water and may be activated for treatment of textiles by the addition of a mild alkaline catalyst.

5. A method of producing a water soluble, reactive condensation product, suitable for treating textiles, which comprises reacting starch and formaldehyde in the presence of an alkaline catalyst to produce a starch methylol, adding to said methylol and catalyst a mixture of acetone and formaldehyde to produce a reaction therebetween with the formation of an acetone methylol and to produce a reaction between said two methylols, the relative proportions of the two methylols being 1 part of starch methylol to about 6 parts of the acetone methylol, confining the resulting reaction solution in tightly closed pressure resistant containers in which the condensation reaction proceeds until the amount of catalyst is exhausted and the resulting condensation product is substantially neutral, is soluble in water and may be activated for treatment of textiles by the addition of a mild alkaline catalyst.

6. A method of producing a water soluble, reactive condensation product, suitable for treating textiles, which comprises reacting starch and formaldehyde in the presence of approximately 0.1% to 1.5% sodium hydroxide and 0.2% to 3% sodium carbonate based on the total weight of the condensation reactants to produce a starch methylol, adding to said methylol and catalyst a mixture of acetone and formaldehyde to produce a reaction therebetween with the formation of an acetone methylol and to produce a reaction between said two methylols, confining the resulting reaction solution in tightly closed pressure resistant containers in which the condensation reaction proceeds until the amount of catalyst is exhausted and the resulting condensation product is substantially neutral, is soluble in water and may be activated for treatment of textiles by the addition of a mild alkaline catalyst.

7. A water soluble reactive condensation product suitable for treating textiles, said product being produced in accordance with the method defined in claim 1.

8. A water soluble reactive condensation product suitable for treating textiles, said product being produced in accordance with the method defined in claim 2.

9. A method of treating cellulosic textiles to obtain shrinkage-setting and other desirable characteristics, comprising applying to said textiles an aqueous solution of a water soluble reactive condensation product as defined in claim 1, said solution also containing a regulated amount of free alkaline catalyst to activate said solution for reaction with said textiles, removing excess solution, heating the thus treated textiles sufficiently to cause a reaction with said solution, and drying the textiles.

10. A method of treating cellulosic textiles to obtain shrinkage-setting and other desirable characteristics, comprising applying to said textiles an aqueous solution of a water soluble reactive condensation product as defined in claim 2, said solution also containing a regulated amount of free alkaline catalyst to activate said solution for reaction with said textiles, removing excess solution, heating the thus treated textiles sufficiently to cause a reaction with said solution, and drying the textiles.

11. A method of treating cellulosic textiles to obtain shrinkage-setting and other desirable characteristics, comprising applying to said textiles an aqueous solution of a water soluble reactive condensation product as defined in claim 3, said solution also containing a regulated amount of free alkaline catalyst to activate said solution for reaction with said textiles, removing excess solution, heating the thus treated textiles sufficiently to cause a reaction with said solution, and drying the textiles.

12. A method of treating cellulosic textiles to obtain shrinkage-setting and other desirable characteristics, comprising applying to said textiles an aqueous solution of a water soluble reactive condensation product as defined in claim 4, said solution also containing a regulated amount of free alkaline catalyst to activate said solution for reaction with said textiles, removing excess solution, heating the thus treated textiles sufficiently to cause a reaction with said solution, and drying the textiles.

13. A method of treating cellulosic textiles to obtain shrinkage-setting and other desirable characteristics, comprising applying to said textiles an aqueous solution of a water soluble reactive condensation product as defined in claim 5, said solution also containing a regulated amount of free alkaline catalyst, to activate said solution for reaction with said textiles, removing excess solution, heating the thus treated textiles sufficiently to cause a reaction with said solution, and drying the textiles.

14. A method of treating cellulosic textiles to obtain shrinkage-setting and other desirable characteristics, comprising applying to said textiles an aqueous solution of a water soluble reactive condensation product as defined in claim 6, said solution also containing a regulated amount of free alkaline catalyst to activate said solution for reaction with said textiles, removing excess solution, heating the thus treated textiles sufficiently to cause a reaction with said solution, and drying the textiles.

15. A method of treating cotton cloth to obtain shrinkage-setting and other desirable characteristics, comprising applying to said cotton cloth an aqueous solution of a water soluble reactive condensation product as defined in claim 1, said solution also containing a regulated amount of free alkaline catalyst to activate said solution for reaction with said cotton cloth, removing excess solution, heating the thus treated cotton cloth sufficiently to cause a reaction with said solution, and drying the cotton cloth.

DMITRY M. GAGARINE.

REFERENCES CITED

The following references are of record in the file of this patent:

UNITED STATES PATENTS

| Number | Name | Date |
| --- | --- | --- |
| 1,397,144 | Plauson | Nov. 15, 1921 |
| 1,514,508 | Ellis | Nov. 4, 1924 |
| 1,941,351 | Hawerlander | Dec. 26, 1933 |
| 1,941,352 | Hawerlander | Dec. 26, 1933 |
| 2,099,765 | Freiherr et al. | Nov. 23, 1937 |
| 2,159,875 | Zwicky et al. | May 23, 1939 |
| 2,238,839 | Watkins | Apr. 15, 1941 |
| 2,288,695 | Fuller | July 7, 1942 |
| 2,390,481 | Whitner | Dec. 4, 1945 |
| 2,411,818 | Weiss | Nov. 26, 1946 |

FOREIGN PATENTS

| Number | Country | Date |
| --- | --- | --- |
| 551,693 | Great Britain | Mar. 5, 1943 |